United States Patent
Ishigami et al.

(10) Patent No.: US 10,074,019 B2
(45) Date of Patent: Sep. 11, 2018

(54) ROAD SURFACE INFORMATION ACQUISITION APPARATUS FOR ENTRANCE/EXIT LANE

(71) Applicant: DENSO CORPORATION, Kariya, Aichi-pref. (JP)

(72) Inventors: Hirotake Ishigami, Nishio (JP); Naoki Kawasaki, Kariya (JP); Syunya Kumano, Okazaki (JP); Shunsuke Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 199 days.

(21) Appl. No.: 14/900,852

(22) PCT Filed: Jun. 25, 2014

(86) PCT No.: PCT/JP2014/066773
§ 371 (c)(1),
(2) Date: Dec. 22, 2015

(87) PCT Pub. No.: WO2014/208574
PCT Pub. Date: Dec. 31, 2014

(65) Prior Publication Data
US 2016/0140401 A1    May 19, 2016

(30) Foreign Application Priority Data
Jun. 28, 2013    (JP) .................................. 2013-136250

(51) Int. Cl.
*H04N 7/18*    (2006.01)
*G06K 9/00*    (2006.01)
(Continued)

(52) U.S. Cl.
CPC ............ *G06K 9/00798* (2013.01); *B60R 1/00* (2013.01); *B60W 30/10* (2013.01); *G06K 9/52* (2013.01); *G06T 7/60* (2013.01)

(58) Field of Classification Search
CPC ................................................... G06K 9/00798
(Continued)

(56) References Cited

U.S. PATENT DOCUMENTS

2007/0050134 A1    3/2007  Hayashida et al.
2008/0114532 A1    5/2008  Nishida et al.
(Continued)

FOREIGN PATENT DOCUMENTS

JP    2003-032669 A    1/2003
JP    2006-338556 A    12/2006
(Continued)

OTHER PUBLICATIONS

International Preliminary Report on Patentability; International Application No. PCT/JP2014/066773; Filed Jun. 25, 2014 (with English Translation).
(Continued)

*Primary Examiner* — Richard Torrente
(74) *Attorney, Agent, or Firm* — Knobbe, Martens, Olson & Bear, LLP

(57) ABSTRACT

A road surface information acquisition apparatus a lane line recognizer configured to, based on a road surface image of a carpool lane forward of a vehicle acquired by a camera, recognize lane lines of the carpool lane. The apparatus further includes a determiner configured to, based on a lane partition line recognized by the lane line recognizer, determine a start point and an end point of the entrance and exit, and a lane-width calculator configured to, based on the lane lines recognized by the lane line recognizer, calculate a lane width of the carpool lane. The apparatus further includes a (Continued)

lane-width corrector configured to, based on determinations made by the determiner, correct the lane width calculated by the lane-width calculator. Based on a broken line as the lane partition line, the determiner determines the start point and the end point of the entrance and exit of the carpool lane.

9 Claims, 5 Drawing Sheets

(51) Int. Cl.
    *B60W 30/10*     (2006.01)
    *B60R 1/00*     (2006.01)
    *G06K 9/52*     (2006.01)
    *G06T 7/60*     (2017.01)

(58) Field of Classification Search
    USPC .......................................................... 348/148
    See application file for complete search history.

(56) References Cited

U.S. PATENT DOCUMENTS

| | | |
|---|---|---|
| 2010/0014707 A1 | 1/2010 | Nakamori et al. |
| 2010/0138115 A1 | 6/2010 | Kageyama et al. |
| 2010/0246889 A1 | 9/2010 | Nara et al. |
| 2012/0194677 A1 | 8/2012 | Suzuki |
| 2012/0226392 A1* | 9/2012 | Kataoka ................ G08G 1/167 701/1 |
| 2012/0265431 A1* | 10/2012 | Hayakawa ................ B60T 7/22 701/301 |

FOREIGN PATENT DOCUMENTS

| | | |
|---|---|---|
| JP | 2007-086052 A | 4/2007 |
| JP | 2008-123348 A | 5/2008 |
| JP | 2010-128862 A | 6/2010 |
| JP | 2010-221859 A | 10/2010 |
| JP | 2012-155612 A | 8/2012 |
| JP | 2013-012044 | 1/2013 |
| WO | 2011/064825 A1 | 6/2011 |
| WO | 2014/208574 A1 | 12/2014 |

OTHER PUBLICATIONS

International Search Report (translated version); International Application No. PCT/JP2014/066773, filed Jun. 5, 2014; 11 pages.

* cited by examiner

ROAD SURFACE INFORMATION ACQUISITION APPARATUS FOR ENTRANCE/EXIT LANE

BACKGROUND

Technical Field

The present invention relates to a road surface information acquisition apparatus for acquiring road surface information about a carpool lane based on a captured road surface image forward of a vehicle.

Background Art

Various assistance apparatuses have been proposed that are configured to acquire road surface information of a road on which a vehicle is travelling to assist a driver in driving the vehicle. For example, an assistance apparatus for conducting lane keeping control recognizes a lane width from a captured image of a road on which a vehicle is travelling and assist the driver in driving the vehicle so that the vehicle can travel in a target travel line set substantially in the center of the lane width.

A travel lane referred to as a carpool lane is employed in highways in large cities in the United States. The carpool lane is introduced to reduce a number of traveling vehicles or popularize environmentally-friendly vehicles (so called "eco-cars") such as electrical vehicles.

More specifically, only ride-sharing vehicles or eco-cars are allowed to travel in the carpool lane. A vehicle occupied by a driver alone or a vehicle that does not meet predefined environmental criteria is forbidden from traveling in the carpool lane. Thus, there is a less number of traveling vehicles in the carpool lane, that is, the carpool lane is more vacant, as compared to in an ordinary lane. Therefore, use of the carpool lane may significantly reduce travel time.

For example, Patent Literature 1 proposes an assistance apparatus for assisting the driver in driving the vehicle also in such a carpool lane.

Patent Literature 1 JP-A-2010-128862

Technical Problem

The carpool lane is often provided parallel to an ordinary lane, where the carpool lane and the ordinary lane are partitioned by a lane line (hereinafter referred to as a lane partition line) therebetween. The lane partition line is basically formed of a plurality of (e.g., four) solid lines. The lane partition line is provided with entrances and exits spaced apart from each other by a predetermined distance. Each entrance and exit is marked by a single broken line, through which vehicles can move from the carpool lane to the ordinary lane or vice versa.

Typically, the carpool lane is broadened toward each entrance and exit (i.e., toward the ordinary lane). A lane width of each of entrance-and-exit lane sections of the carpool lane is greater than a lane width of each of lane sections of the carpool lane other than the entrance-and-exit lane sections. Therefore, when the vehicle is passing the entrance and exit of the carpool lane, the assistance apparatus determines that the lane width of the carpool lane is increased, which may cause the assistance apparatus to displace the target travel line toward the entrance and exit (toward the ordinary lane). When the vehicle has passed the entrance and exit of the carpool lane, then the assistance apparatus determines that the lane width of the carpool lane is decreased, which may cause the assistance apparatus to restore the target travel line. Accordingly, each time the vehicle passes the entrance and exit, the target travel line may be curved (become wavy), which may lead to unstable travelling of the vehicle.

SUMMARY

In consideration of the foregoing, exemplary embodiments of the present invention are directed to providing a road surface information acquisition apparatus capable of properly recognizing each entrance and exit of a carpool lane and acquiring a proper lane width of the carpool lane.

In a road surface information acquisition apparatus according to an exemplary embodiment of the present invention, for a carpool lane that is provided with entrances and exits at given spacing intervals, a lane width of each of entrance-and-exit lane sections of the carpool lane being set greater than a lane width of each of lane sections of the carpool lane other than the entrance-and-exit lane sections, the apparatus includes: an image acquirer configured to capture an image of a road surface of the carpool lane in a forward traveling direction of a vehicle to acquire a road surface image; a lane line recognizer configured to, based on the road surface image acquired by the image acquirer, recognize lane lines marked on the road surface of the carpool lane; a determiner configured to determine a start point of the entrance and exit of the carpool lane based on a lane partition line between the carpool lane and an ordinary lane, the lane partition line being recognized by the lane line recognizer; a lane-width calculator configured to, based on the lane lines recognized by the lane line recognizer, calculate a lane width of the carpool lane; and a corrector configured to, based on determinations made by the determiner, correct the lane width calculated by the lane-width calculator, wherein the determiner is configured to, based on a broken line as the lane partition line recognized by the lane line recognizer, determine the start point of the entrance and exit of the carpool lane.

With this configuration, the corrector corrects the lane widths calculated by the lane-width calculator based on the determinations made by the determiner. Thus, the lane width values calculated by the lane-width calculator are properly corrected when the vehicle passes the entrance and exit of the carpool lane, which can provide the lane width of the carpool lane leading to stable travelling of the vehicle.

Typically, at each entrance and exit of the carpool lane, the lane partition line between the carpool lane and the ordinary lane is often indicated by a broken line. Therefore, the determiner is configured to, based on the broken lane partition line recognized by the lane line recognizer, determine the start point and the end point of the entrance and exit of the carpool lane. That is, the determiner is allowed to, based on a lane line pattern specific to the entrance and exit, determine the start point and the end point of the entrance and exit of the carpool lane, which allows the start point and the end point of the entrance and exit to be recognized properly.

DESCRIPTION OF EMBODIMENTS

A road surface information acquisition apparatus in accordance with one embodiment of the present invention will now be explained with reference to the accompanying drawings.

(Carpool Lane)

A carpool lane CL will now be explained, for which road surface information is acquired by the road surface information acquisition apparatus 24.

Figure 1:
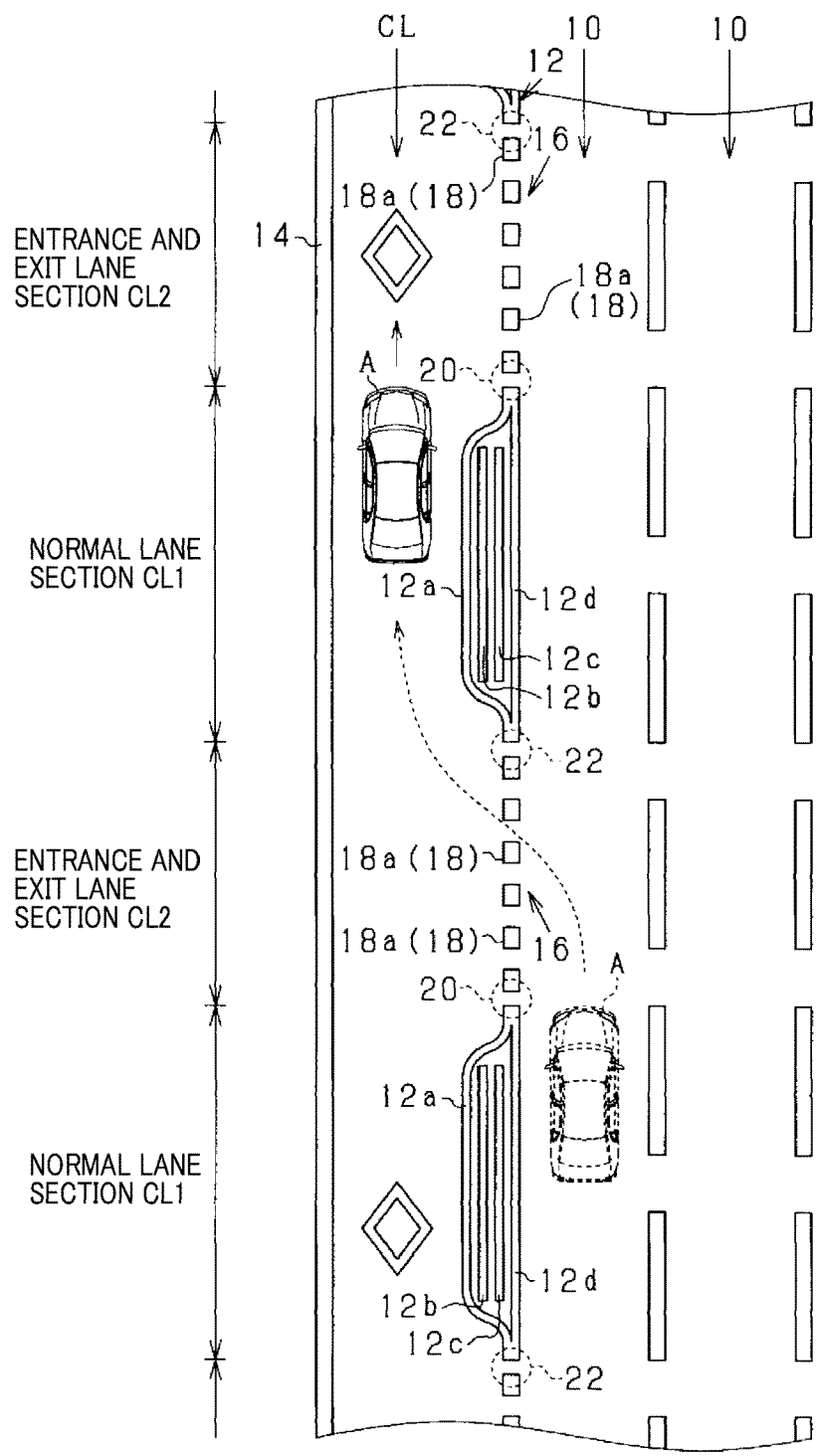
FIG. 1 is a top view of a highway in which a carpool lane is provided.

FIG. 1 shows a top view of a highway in which the carpool lane CL is provided. The carpool lane CL is parallel to an ordinary traveling lane (hereinafter referred to as an ordinary lane 10). The carpool lane CL is either of the leftmost and rightmost lanes of the highway (e.g., the leftmost lane in FIG. 1). The carpool lane CL is defined by a lane line between the ordinary lane 10 and the carpool lane CL (referred to as a lane partition line 12) and a lane line on the opposite side of the carpool lane CL to the partition line 12 (e.g., on the left side of the carpool lane CL in FIG. 1) (referred to as a side line 14).

Figure 2:
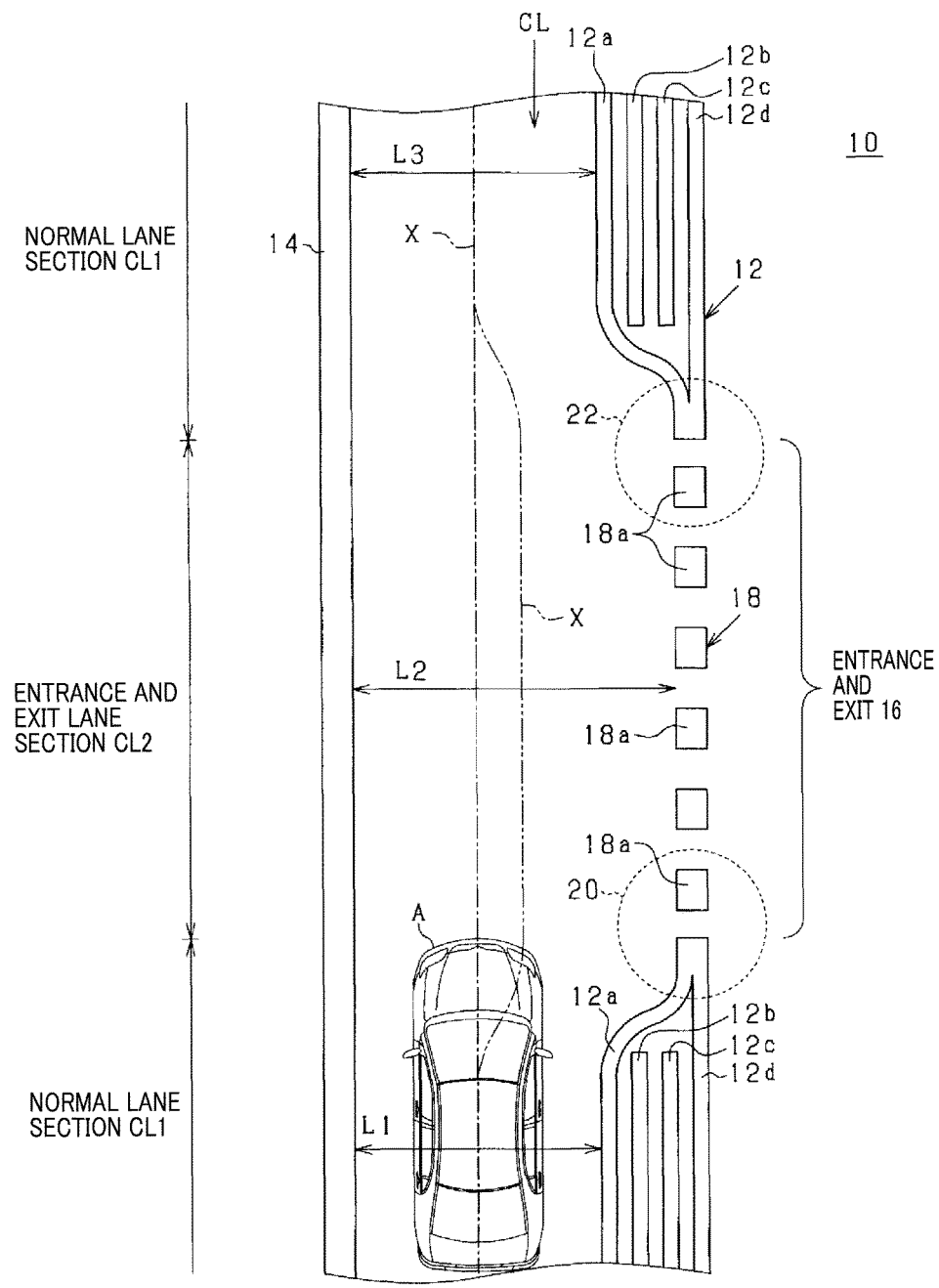
FIG. 2 is an enlarged top view of the vicinity of an entrance and exit of the carpool lane.

As shown in FIGS. 1 and 2, the lane partition line 12 is formed of a plurality of (e.g., four in the present embodiment) sub-lines 12a-12d. The four sub-lines 12a-12d may also be referred to first to fourth sub-lines 12a-12d in the order from inside the carpool lane CL toward the outside. Each of the first to fourth sub-lines 12a-12d is a solid line. The first sub-line 12a and the fourth sub-line 12d are colored white (i.e., white lines). The second sub-line 12b and the third sub-line 12c are colored orange.

The lane partition line 12 has entrances and exits 16 to the ordinary lane 10 at given spacing intervals (e.g., 3 km). Each entrance and exit 16 is formed of a broken line provided in a prolongation of the fourth sub-line 12d (referred to as a broken lane line 18). The broken lane line 18 is formed of a plurality of rectangular unit lines 18a spaced apart from each other at given spacing intervals in a traveling direction of the vehicle A. The broken lane line 18 is colored white. In FIG. 1, the spacing between the entrances and exits 16 is shown as less than that of the actual carpool lane CL.

As shown in FIG. 2, the second sub-line 12b and the third sub-line 12c of the lane partition line 12 are interrupted in proximity to each entrance and exit 16. The first sub-line 12a is curved toward the fourth sub-line 12d (i.e., toward the ordinary lane 10) to connect to the fourth sub-line 12d so as to surround terminating ends of the second sub-line 12b and the third sub-line 12c. The first sub-line 12a and the fourth sub-line 12d are interrupted at a point where they connect to each other.

A forward point in the traveling direction of the vehicle A where the first sub-line 12a and the fourth sub-line 12d are connected to each other and then interrupted and the broken lane line 18 begins is indicative of a start point 20 (start position) of the entrance and exit 16. A forward point in the traveling direction of the vehicle A where the broken lane line 18 terminates and a connection between the first sub-line 12a and the fourth sub-line 12d follows the broken lane line 18 is an endpoint 22 (end position) of the entrance and exit 16.

The side line 14 indicated by one solid line is extends along the highway. The side line 14 is colored yellow or orange.

Lane sections of the carpool lane LC other than lane sections corresponding to the entrances and exits 16 are referred to as normal lane sections CL1, and the lane sections corresponding to the entrances and exits 16 are referred to as entrance-and-exit lane section CL2. A lane width of each normal lane section CL1 of the carpool lane CL is defined by a spacing between the first sub-line 12a and the side line 14 (see L1 and L3 in FIG. 2). In defining the lane width of each normal lane section CL1, portions of the carpool lane LC where the first sub-line 12a is curved toward the fourth sub-line 12d are excluded. A width of each entrance-and-exit lane section CL2 of the carpool lane CL is defined by a spacing between the broken lane line 18 and the side line 14 (see L2 in FIG. 2). The broken lane line 18 is farther apart from than side line 14 than from the first sub-line 12a. Therefore, the lane width of each entrance-and-exit lane section CL2 of the carpool lane CL becomes greater than the lane width of each normal lane section CL.

Figure 3:
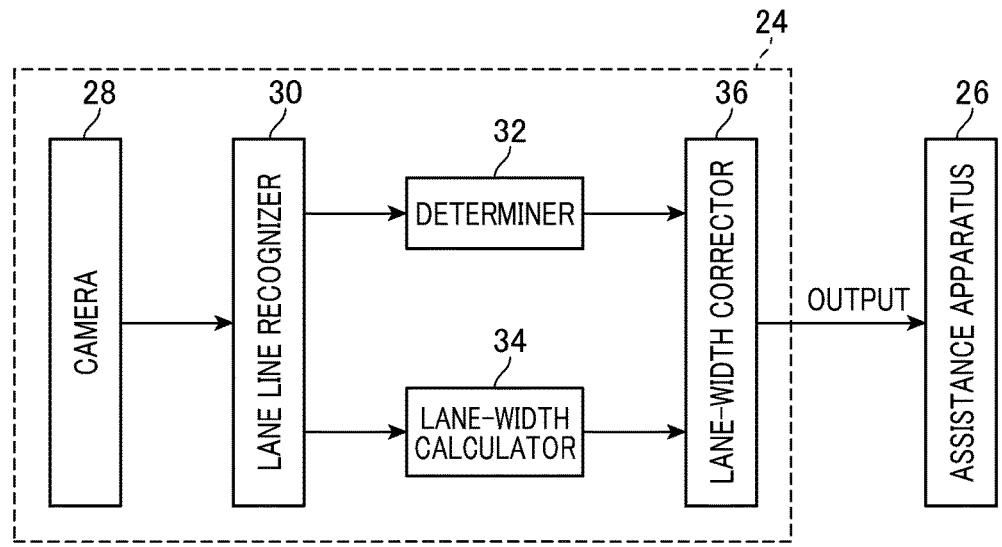
FIG. 3 is a block diagram of a road surface information acquisition apparatus in accordance with one embodiment of the present invention.

The road surface information acquisition apparatus 24 of the present embodiment will now be explained. FIG. 3 shows a block diagram of the road surface information acquisition apparatus 24.

(Road Surface Information Acquisition Apparatus)

As shown in FIG. 3, the road surface information acquisition apparatus 24 of the present embodiment basically includes a camera 28 (as an image acquirer), a lane line recognizer 30 (lane line recognizer), a determiner 32 (as a determiner), a lane-width calculator 34 (as a lane-width calculator), and a lane-width corrector (as a corrector) 36. The road surface information acquisition apparatus 24 is electrically connected to an assistance apparatus 26 configured to conduct lane keeping control. The road surface information acquisition apparatus 24 acquires road surface information of the carpool lane CL (about a lane width of the carpool lane) and outputs the road surface information to the assistance apparatus 26.

A charge-coupled device (CCD) camera or a CMOS camera may be used as the camera 28. The camera 28 captures a three primary color image of a landscape including a road surface in the forward traveling direction of the vehicle A. The camera 28 may be attached to a rearview mirror (not shown) of the vehicle A. The camera 28 sequentially captures the forward image in the travel direction (e.g., every twenty-fourth of a second (per frame)) and generates image data of the captured road surface (hereinafter referred to as road surface image). A field of capture of the camera 28 includes at least the entire width (lateral dimension) of the carpool lane CL while the vehicle A is travelling in the carpool lane CL. That is, the lane partition line 12 and the side line 14 of the carpool lane CL are always captured by the camera 28 while the vehicle A is traveling in the carpool lane CL.

The lane line recognizer 30 recognizes the lane lines of the carpool lane CL (the lane partition line 12 and the side line 14) based on the road surface image captured by the camera 28. The lane line recognizer 30 extracts lane lines from the captured road surface image using well-known image processing and determines positions and types of the lane lines. For example, the lane line recognizer 30 applies edge detection to the road surface image to extract edge points.

The lane line recognizer 30 extracts the edge points using a typical highpass filter. Based on outputs of the highpass filter, an edge point for which red (R) and green (G) signal components are above a predetermined threshold and a blue (B) signal component is below the predetermined threshold can be determined to be yellow (or orange) colored. Thus edge points of yellow-colored lane lines (i.e., the side line 14, the first sub-line 12a, and the fourth sub-line 12d) can be extracted.

The lane line recognizer 30 determines that an edge point for which all R, G, and B signal components are above the predetermined threshold can be determined to be white colored. Thus edge points of the white-colored lane line (i.e., the second sub-line 12b, the third sub-line 12c, and the broken lane line 18) can be extracted.

Next, the lane line recognizer 30 applies a well-known Hough transform to the extracted edge points to recognize positions and types of the lane lines. That is, the lane line recognizer 30 recognizes the side line 14 and the lane partition line 12 that form the lane lines of the carpool lane CL and determines positions of the side line 14 and the lane partition line 12. Further, the lane line recognizer 30 recognizes the first to fourth sub-lines 12a-12d and the broken lane lines 18 that form the lane partition line 12 and determines positions of the first to fourth sub-lines 12a-12d and the broken lane lines 18.

The determiner 32 determines (recognizes) a start point 20 and an end point 22 of each entrance and exit 16 of the carpool lane CL based on the lane partition line 12 recognized by the lane line recognizer 30. That is, when the vehicle A passes the start point 20 of the entrance and exit 16, the determiner 32 determines the start point 20 of the entrance and exit 16 from the lane partition line 12 recognized by the lane line recognizer 30. Further, when the vehicle A passes the end point 22 of the entrance and exit 16, the determiner 32 determines the end point 22 of the entrance and exit 16 from the lane partition line 12 recognized by the lane line recognizer 30.

Further, while the vehicle A is traveling in the entrance-and-exit lane section CL2 of the carpool lane CL, the determiner 32 determines that the vehicle A is passing the entrance and exit 16 based on the lane partition line 12 recognized by the lane line recognizer 30.

A determination method of the determiner 32 will now be explained in more detail. As described above, each entrance and exit 16 of the carpool lane CL is indicated by the broken lane line 18. Therefore, the determiner 32 determines the start point 20 and the end point 22 of the entrance and exit 16 based on the broken lane line 18 of the lane partition line 12.

When the vehicle A traveling in the carpool lane CL reaches the entrance and exit 16, the lane partition line 12 changes from the first to fourth sub-lines 12a-12d that are four solid lines to the broken lane line 18a that is a single broken line. Thus the determiner 32 determines the start point 20 of the entrance and exit 16 when the lane line of the carpool lane CL recognized by the lane line recognizer 30 has changed from the solid lines to the broken line. When the determiner 32 has determined the start point 20 of the entrance and exit 16, the determiner 32 turns on an entrance-and-exit flag, which indicates that the vehicle A is traveling in the entrance-and-exit lane section CL2.

While the vehicle A is passing the entrance and exit 16 of the carpool lane CL (or when the vehicle A is traveling in the entrance-and-exit lane section CL2), the single broken lane line 18 continues. Therefore, while the broken lane line 18 (broken lane partition line 12) is recognized by the lane line recognizer 30, the determiner 32 determines that the vehicle A is passing the entrance and exit 16.

When the vehicle A passes the end point 22 of the entrance and exit 16, the lane partition line 12 changes from the single broken lane line 18 to the first to fourth sub-lines 12a-12d that are four solid lines. The determiner 32 determines the end point 22 of the entrance and exit 16 when the lane line of the carpool lane CL recognized by the lane line recognizer 30 has changed from the broken line to the solid lines. When the determiner 32 has determined the end point 22 of the entrance and exit 16, the determiner 32 turns off the entrance-and-exit flag.

The lane-width calculator 34 calculates a lane width of the carpool lane CL based on the lane lines recognized by the lane line recognizer 30. More specifically, the lane-width calculator 34 acquires a spacing or distance between the side line 14 and the lane partition line 12 recognized by the lane line recognizer 30 to calculate the lane width of the carpool lane CL.

In the normal lane section CL1 of the carpool lane CL, the lane-width calculator 34 calculates a spacing between the lane line, of the lane partition line 12, that is closest to the vehicle A (i.e., the first sub-line 12a) and the side line 14 (see L1, L3 in FIG. 2) as a lane width. In the entrance-and-exit lane section CL2 of the carpool lane CL, the lane-width calculator 34 calculates a spacing between the broken lane line 18 and the side line 14 (see L2 in FIG. 2) as a lane width. That is, the lane width value of the entrance-and-exit lane section CL2 calculated by the lane-width calculator 34 is greater than the lane width value of the normal lane section CL1.

The lane-width calculator 34 includes a storage (not shown), such as data writable RAM or the like, to store the lane widths calculated in several previous cycles (for several seconds) and updates the stored lane widths.

The lane-width corrector 36 corrects the lane width value calculated by the lane-width calculator 34 based on the determinations made by the determiner 32. More specifically, when the determiner 32 has not determined the start point 20 of the entrance and exit 16 (entrance and exit 16), the lane-width corrector 36 simply determines the lane width value calculated by the lane-width calculator 34 as the current lane width value of the carpool lane CL. That is, in the normal lane section CL1, the lane-width corrector 36 simply employs the lane width value calculated by the lane-width calculator 34, without correcting it.

When the determiner 32 has determined the start point 20 of the entrance and exit 16 (that is, when the vehicle A has reached the entrance and exit 16), the vehicle A will pass the entrance and exit 16 (the vehicle A will travel in the entrance-and-exit lane section CL2). The lane width at the entrance and exit 16 calculated by the lane-width calculator 34 becomes greater than the lane width calculated when the vehicle A is traveling in the normal lane section CL1. If the calculated value were employed as the lane width of the carpool lane CL and outputted to the assistance apparatus 26, the assistance apparatus 26 would determine that the line width of the carpool lane CL had increased. This would cause the assistance apparatus 26 to set a target travel line X displaced toward the entrance and exit 16 (the ordinary lane 10) (see the dashed-two dotted line in FIG. 2).

Therefore, when the determiner 32 has determined the start point 20 of the entrance and exit 16, the lane-width corrector 36 cancels the lane width calculated subsequently by the lane-width calculator 34. The lane-width corrector 36 determines a lane width value calculated by the lane-width calculator 34 (i.e., a value of lane width of the normal lane section CL1) before the determiner 32 determines the start point 20 of the entrance and exit 16, as the current lane width.

More specifically, the lane-width corrector 36 reads, from the storage of the lane-width calculator 34, the lane width value stored before the determiner 32 determining the start point 20 of the entrance and exit 16 (see L1 in FIG. 2) out of the lane width values stored in the storage. The read value is determined as the current lane width of the carpool lane CL. Where, the lane-width corrector 36 is configured to read, from the storage, a value of lane width of a portion of the normal lane section CL1 in which the first sub-line 12a is parallel to the side line 14.

Further, while the vehicle A is passing the entrance and exit 16 (i.e., while the vehicle A is traveling in the entrance-and-exit lane section CL2), the lane-width corrector 36 maintains, as the lane width, the value of lane width calculated by the lane-width calculator 34 before the determiner 32 determining the start point 20 of the entrance and exit 16. That is, while the determiner 32 continues determining that the vehicle A is passing the entrance and exit 16 (while the lane line recognizer 30 continues recognizing the broken lane line 18), the lane-width corrector 36 maintains, as the current lane width, the lane width value of the normal lane section CL1 (see L1 in FIG. 2).

When the vehicle A transfers to the normal lane section CL1 after passing the entrance and exit 16, the lane width of the carpool lane CL decreases. Therefore, after passing the entrance and exit 16, it becomes unnecessary to maintain the lane width of the carpool lane CL before the vehicle A reaching the entrance and exit 16 as the current lane width. Thus, when the determiner 32 determines the end point 22 of the entrance and exit 16, the lane-width corrector 36 simply determines, as the lane width of the carpool lane CL, the lane width value calculated by the lane-width calculator 34 (see L3 in FIG. 2).

While the vehicle A is traveling in the entrance-and-exit lane section CL2 of the carpool lane CL, the lane-width corrector 36 employs the lane width value calculated by the lane-width calculator 34 while the vehicle A is traveling in the normal lane section CL1. When the vehicle A travels in the normal lane section CL1 of the carpool lane CL, the lane width value calculated by the lane-width calculator 34 is simply used.

The lane-width corrector 36 outputs the determined lane width of the carpool lane CL to the assistance apparatus 26. The assistance apparatus 26 sets the target travel line X based on the received lane width of the carpool lane CL. That is, the target travel line X is set such that it passes though the center of the lane width received from the lane-width corrector 36. The assistance apparatus 26 assists a driver in driving the vehicle A so that the vehicle A travels in the target travel line X.

The operations of the road surface information acquisition apparatus 24 of the present embodiment will now be explained. In the following, it is assumed that the vehicle A continues traveling in the carpool lane CL without transferring to the ordinary lane 10 via the entrance and exit 16.

Figure 4:
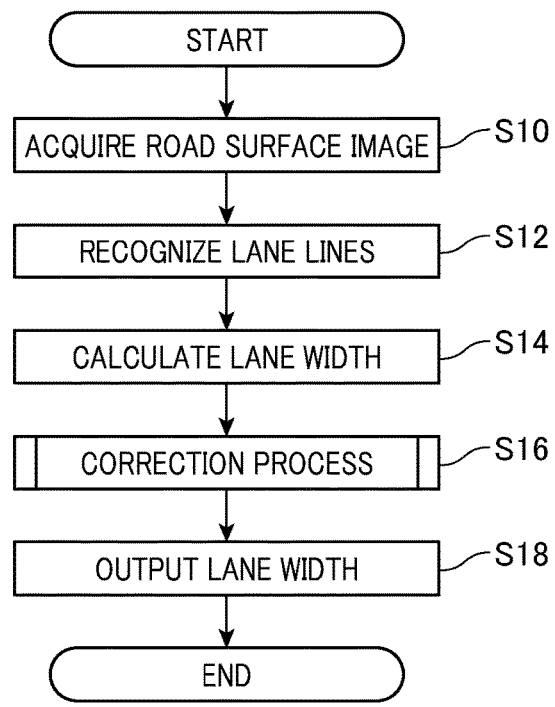
FIG. 4 is a flowchart of a control flow where the road surface information acquisition apparatus outputs a lane width of the carpool lane.

FIG. 4 is a flowchart depicting a control flow for the road surface information acquisition apparatus 24 to determine the lane width of the carpool lane CL. In step S10, while the vehicle A is traveling in the carpool lane CL, the camera 28 captures an image of the road surface of the carpool lane CL in the forward traveling direction to acquire a road surface image. The road surface image captured by the camera 28 is fed to the lane line recognizer 30. In step S12, the lane line recognizer 30 recognizes respective lane lines of the carpool lane CL from the road surface image. That is, the lane line recognizer 30 recognizes the side line 14 and the lane partition line 12 (the first to fourth sub-lines 12a-12d or the broken lane line 18) of the carpool lane CL and acquires locations of the respective lane lines.

Subsequently, in step S14, based on the lane lines recognized by the lane line recognizer 30, the lane-width calculator 34 calculates the lane width of the carpool lane CL. When the vehicle A is traveling in the normal lane section CL1, the lane-width calculator 34 calculates a spacing between the side line 14 and the first sub-line 12a recognized by the lane line recognizer 30. When the vehicle A is traveling in the entrance-and-exit lane section CL2 of the carpool lane CL, the lane-width calculator 34 calculates a spacing between the side line 14 and the broken lane line 18 recognized by the lane line recognizer 30. The lane-width calculator 34 sequentially stores the calculated lane widths in the storage.

After the lane-width calculator 34 has calculated the lane width, a correction process is performed in step S16 where the calculated lane width is corrected. The correction process will be described later. In step S18, the current lane width of the carpool lane CL is determined in the correction process, and then the determined lane width is outputted to the assistance apparatus 26. Then, the process flow ends.

Figure 5:
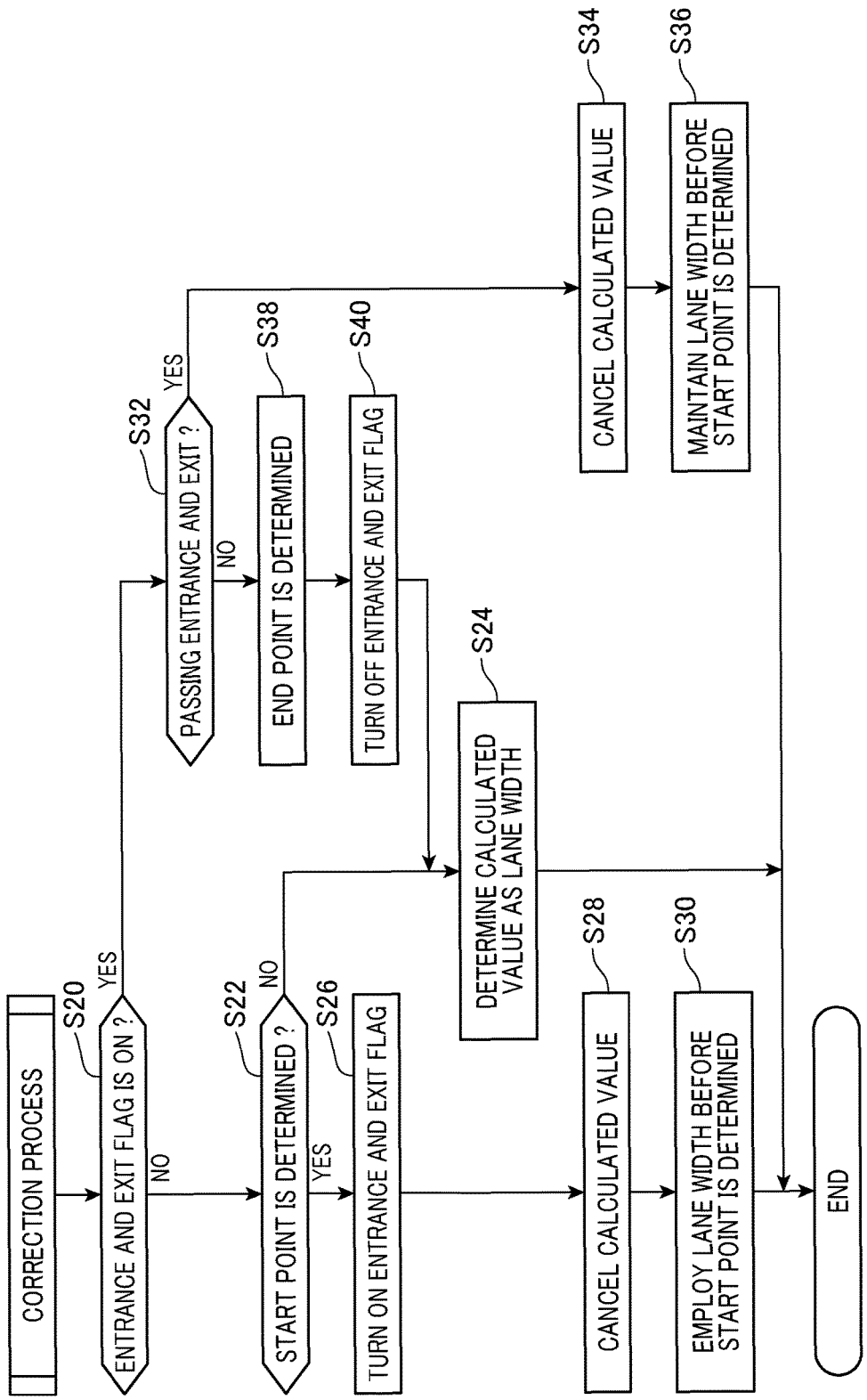
FIG. 5 is a flowchart of a correction process.

The correction process will now be explained with reference to the flowchart of FIG. 5.

(When the Vehicle is Traveling in the Normal Lane Section)

First, step S20 will now be explained under a situation where the vehicle A is traveling in the normal lane section CL1 of the carpool lane CL. It is assumed that the entrance-and-exit flag in the determiner 32 is OFF. Upon initiation of the correction process, it is determined whether or not the entrance-and-exit flag of the determiner 32 is ON. If in step S20 it is determined that the entrance-and-exit flag is OFF, then the process proceeds to step S22.

In step S22, it is determined whether or not the determiner 32 has determined the start point 20 of the entrance and exit 16. The determiner 32 determines whether or not the start point 20 of the entrance and exit 16 is reached based on the lane partition line 12 recognized in step S12 by the lane line recognizer 30.

If the vehicle A is traveling in the normal lane section CL1 of the carpool lane CL, the lane line recognizer 30 recognizes the first to fourth sub-lines 12a-12d as the lane partition line 12. Therefore, the process proceeds to step S24 without the determiner 32 determining the start point 20 of the entrance and exit 16 in step S22.

In step S24, the lane-width corrector 36 simply determines the lane width calculated in step S14 by the lane-width calculator 34 as the lane width of the carpool lane CL. That is, while the vehicle A is traveling in the normal lane section CL1, a spacing between the side line 14 and the first sub-line 12a is determined as the lane width of the carpool lane CL (see L1 and L3 in FIG. 2). After the lane width of the carpool lane CL is determined, the correction process is completed.

(When the Vehicle Transfers From the Normal Lane Section to the Entrance-and-exit Lane Section) A situation where the vehicle A transfers from the normal lane section CL1 to the entrance-and-exit lane section CL2 (when the vehicle A passes the start point 20) will be explained. Where, it is determined in step S20 that the entrance-and-exit flag is OFF. In step S22, it is determined whether or not the determiner 32 has determined the start point 20 of the entrance and exit 16.

When the vehicle A transfers from the normal lane section CL1 to the entrance-and-exit lane section CL2, the lane partition line 12 changes from the solid fourth sub-line 12*d* (first sub-line 12*a*) to the broken lane line 18. That is, the lane line recognized by the lane line recognizer 30 changes from the solid line to the broken line, which allows the determiner 32 to determine the start point 20 of the entrance and exit 16 in step S22. If in step S22 it is determined that the determiner 32 has determined the start point 20 of the entrance and exit 16, then in step S26 the entrance-and-exit flag is turned on.

When the vehicle A transfers from the normal lane section CL1 to the entrance-and-exit lane section CL2, the lane width of the carpool lane CL calculated in step S14 by the lane-width calculator 34 increases from the spacing between the side line 14 and the first sub-line 12*a* (see L1 in FIG. 2) to the spacing between the side line 14 and the broken lane line 18 (see L2 in FIG. 2). Therefore, if the lane width of the entrance-and-exit lane section CL2 calculated by the lane-width calculator 34 were simply employed, the target travel line X set by the assistance apparatus 26 would be curved toward the entrance and exit 16 (see the dashed-two dotted line in FIG. 2).

Therefore, in step S28, the lane-width corrector 36 cancels the lane width calculated in step S14 by the lane-width calculator 34. Subsequently, in step S30, the lane-width corrector 36 determines the lane width value calculated by the lane-width calculator 34 before the determiner 32 determining the start point 20 of the entrance and exit 16 as the current lane width. That is, the lane-width corrector 36 determines, out of the lane widths stored in the storage of the lane-width calculator 34, the lane width value calculated by the lane-width calculator 34 before the determiner 32 determining the start point 20 of the entrance and exit 16 as the current lane width.

In this way, the earlier lane width of the carpool lane CL (i.e., the lane width of the normal lane section CL1) is used as the lane width of the carpool lane CL after the vehicle A has reached the entrance and exit 16. The target travel line X set by the assistance apparatus 26 using the earlier lane width is in coincident alignment with the target travel line X that is set as the vehicle A is traveling in the normal lane section CL1 (see the dashed-dotted line in FIG. 2). This can prevent the target travel line X from being curved toward the entrance and exit 16 by being affected by the actual lane width of the entrance-and-exit lane section CL2.

(When the Vehicle is Traveling in the Entrance-and-Exit Lane Section)

A situation where the vehicle A is traveling in the entrance-and-exit lane section CL2 will now be explained. When the vehicle A is traveling in the entrance-and-exit lane section CL2, the start point 20 of the entrance and exit 16 has been determined by the determiner 32 in step S22, where the entrance-and-exit flag is ON (see step S26). Therefore, if the vehicle A is traveling in the entrance-and-exit lane section CL2, "YES" is determined in step S20. Then the proceed proceeds to step S32.

Since the lane partition line 12 of the entrance-and-exit lane section CL2 is formed of the broken lane line 18, the lane line recognizer 30 will continue to recognize the broken lane line 18 while the vehicle A is traveling in the entrance-and-exit lane section CL2. Thus, the determiner 32 determines that the vehicle A is passing the entrance and exit 16. In addition, when the vehicle A travels in the entrance-and-exit lane section CL2, the lane width calculated by the lane-width calculator 34 in step S14 is a spacing between the side line 14 and the broken lane line 18 (see L2 in FIG. 2).

If in step S32 it is determined by the determiner 32 that the vehicle A is passing the entrance and exit 16, then in step S34 the lane-width corrector 36 cancels the lane width calculated by the lane-width calculator 34. In step S36, the lane-width corrector 36 maintains, as the current lane width of the carpool lane CL, the lane width calculated by the lane-width calculator 34 before the determiner 32 determining the start point 20 of the entrance and exit 16. That is, while the determiner 32 determines that the vehicle A is passing the entrance and exit 16, the lane-width corrector 36 maintains, as the current lane width of the carpool lane CL, the lane width value determined in step S30.

Thus, while the vehicle A is traveling in the entrance-and-exit lane section CL2, the lane width of the carpool lane CL is maintained at the lane width value of the normal lane section CL1 (see L1 in FIG. 2). Accordingly, the target travel line X set by the assistance apparatus 26 while the vehicle A is traveling in the entrance-and-exit lane section CL2 is in coincident alignment with the target travel line X set for the normal lane section CL1. This can prevent the target travel line X from being curved toward the entrance and exit 16 by being affected by the actual lane width of the entrance-and-exit lane section CL2.

(When the Vehicle Transfers from the Entrance-and-Exit Lane Section to the Normal Lane Section)

A situation where the vehicle A transfers from the entrance-and-exit lane section CL2 to the normal lane section CL1 (the vehicle A passes the end point 22) will now be explained. Since the entrance-and-exit flag is ON according to the determination made in step S22, the lane-width corrector 36, in step 32, determines whether or not the determiner 32 has determined the entrance and exit 16.

When the vehicle A transfers from the entrance and exit 16 to the normal lane section CL1, the lane line recognized by the lane line recognizer 30 changes from the broken lane line 18 to the fourth sub-line 12*d* (first sub-line 12*a*). Therefore, the lane line recognizer 30 ceases to recognize the broken lane line 18, and thus in step S32 the determiner 32 ceases to determine that the vehicle A is passing the entrance and exit 16. The change of the lane line recognized by the lane line recognizer 30 from the broken line to the solid line allows the determiner 32 to determine the end point 22 of the entrance and exit 16 in step S38. When the determiner 32 determines the end point 22 of the entrance and exit 16, the determiner 32 turns off the entrance-and-exit flag in step S40.

After the vehicle A has transferred to the normal lane section CL1, the lane width of the carpool lane CL does not have to be maintained at the lane width value set in step S30, but the lane width calculated by the lane-width calculator 34 may be simply used as the lane width of the carpool lane CL. When the determiner 32 determines the end point 22 of the entrance and exit 16, the lane-width corrector 36, in step S24, determines the lane width value calculated by the lane-width calculator 34 in step S14 as the current lane width of the carpool lane CL.

In this way, after the vehicle A has transferred to the normal lane section CL1, the lane width of the normal lane section CL1 calculated by the lane-width calculator 34 in real time (see L3 in FIG. 2) is outputted to the assistance apparatus 26. Therefore, the target travel line X set by the assistance apparatus 26 can properly reflect the lane width of the normal lane section CL1.

The road surface information acquisition apparatus of the present embodiment can provide the following advantages.

(1) The lane-width corrector 36 corrects the lane widths calculated by the lane-width calculator 34 based on the determinations made by the determiner 32. Thus, the lane-width calculator 34 corrects the lane width values calculated by the lane-width calculator 34 when the vehicle A passes each entrance and exit 16 of the carpool lane CL, which can provide the lane width of the carpool lane CL leading to stable travelling of the vehicle A.

The determiner 32 determines the start point 20 and the end point 22 of each entrance and exit 16 of the carpool lane CL based on the broken lane line 18 recognized by the lane line recognizer 30. That is, the determiner 32 determines the start point 20 and the end point 22 of the entrance and exit 16 based on marking patterns specific to the entrance and exit 16 of the carpool lane CL, which allows the start point 20 and the end point 22 of the entrance and exit 16 to be recognized properly.

(2) When the determiner 32 determines the start point 20 of the entrance and exit 16, the lane-width corrector 36 cancels the lane width calculated by the lane-width calculator 34. The lane-width corrector 36 employs, as the current lane width of the carpool lane CL, the lane width calculated by the lane-width calculator 34 before the determiner 32 determines the start point 20 of the entrance and exit 16. That is, when the start point 20 of the entrance and exit 16 is determined, the lane-width corrector 36 employs not the actual lane width of the carpool lane CL at the entrance and exit 16, but the lane width of the carpool lane CL calculated before the vehicle A reaches the entrance and exit 16. Therefore, even when the vehicle A has reached the entrance-and-exit lane section CL2, the lane width of the carpool lane CL leading to stable travelling of the vehicle A can be obtained.

(3) While the lane line recognizer 30 recognizes the broken lane line 18, the determiner 32 determines that the vehicle A is passing the entrance and exit 16. When the determiner 32 determines the entrance and exit 16, the lane-width corrector 36 cancels the lane width calculated by the lane-width calculator 34, and maintains, as the current lane width of the carpool lane CL, the lane width calculated before the vehicle A reaches the entrance and exit 16. That is, while the lane line recognizer 30 recognizes the broken lane line 18, the lane-width corrector 36 employs not the actual lane width of the carpool lane CL at the entrance and exit 16, but the lane width of the carpool lane CL calculated before the vehicle A reaches the entrance and exit 16. Therefore, even when the vehicle A is passing the entrance and exit 16, the lane width of the carpool lane CL leading to stable travelling of the vehicle A can be obtained.

(4) When the determiner 32 determines the start point 20 of the entrance and exit 16, the lane-width corrector 36 employs the value of lane width calculated by the lane-width calculator 34 as the current lane width of the carpool lane CL. That is, after the vehicle A has passed the entrance and exit 16, the actual lane width of the carpool lane CL is employed, which allows the lane width of the carpool lane CL to be ascertained accurately. Therefore, also after the vehicle A has returned to the normal lane section CL1, the lane width of the carpool lane CL leading to stable travelling of the vehicle A can be obtained.

(5) The determiner 32 determines the start point 20 of each entrance and exit 16 of the carpool lane CL upon change of the lane partition line 12 recognized by the lane line recognizer 30 from the solid line to the broken lane line. That is, the determiner 32 determines the start point 20 of the entrance and exit 16 based on the marking pattern specific to the start point 20 of the entrance and exit 16, which allows the start point 20 of the entrance and exit 16 to be recognized properly.

(6) The determiner 32 determines the end point 22 of each entrance and exit 16 of the carpool lane CL upon change of the lane partition line 12 recognized by the lane line recognizer 30 from the broken lane line to the solid line. That is, the determiner 32 determines the end point 22 of the entrance and exit 16 based on the marking pattern specific to the end point 22 of the entrance and exit 16, which allows the end point 22 of the entrance and exit 16 to be recognized properly.

MODIFICATIONS

Some modifications to the road surface information acquisition apparatus 24 of the above embodiment will now be described. Only differences from the above embodiment will be explained. The same elements as in the above embodiment are assigned the same numbers and will not be described again.

In the embodiment, the determiner 32 determines the start point 20 of each entrance and exit 16 of the carpool lane CL upon change of the lane partition line 12 recognized by the lane line recognizer 30 from the solid line (the first to fourth sub-lines 12*a*-12*d*) to the broken line (broken lane line 18). In addition, the determiner 32 determines the end point 22 of each entrance and exit 16 of the carpool lane CL upon change of the lane partition line 12 recognized by the lane line recognizer 30 from the broken line (broken lane line 18) to the solid line (the first to fourth sub-lines 12*a*-12*d*). That is, in the present embodiment, the determiner 32 determines the start point 20 and the end point 22 of each entrance and exit 16 based on types of lane lines that occur at the start point 20 and the end point 22 of the entrance and exit 16.

In one modification to the above embodiment, upon recognition of patterns of the lane partition line 12 specific to the start point 20 and the end point 22 of each entrance and exit 16, the determiner 32 determines the start point 20 and the end point 22 of the entrance and exit 16. That is, in the present modification, the start point 20 and the end point 22 of each entrance and exit 16 are determined based on shapes of the lane partition line 12 specific to the start point 20 and the end point 22 of the entrance and exit 16.

Figure 6:
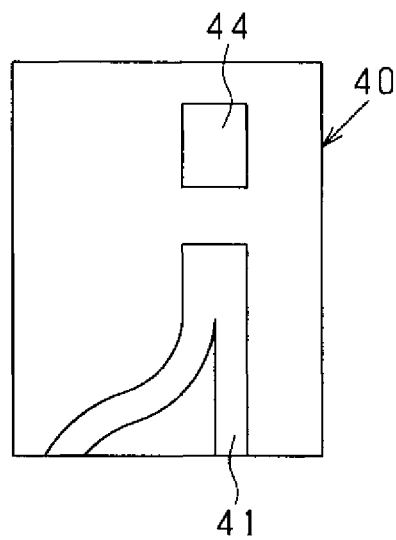
FIG. 6 is a start point template in accordance with a modification.
Figure 7:
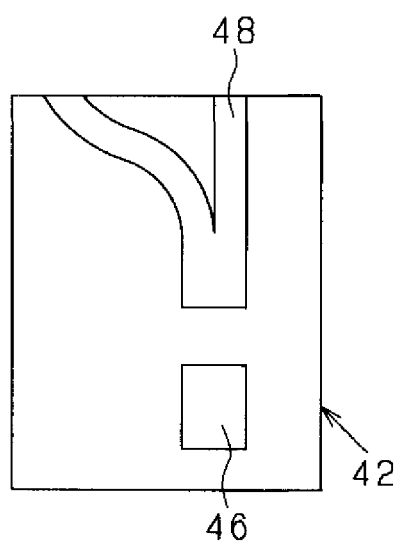
FIG. 7 is an end point template in accordance with the modification.

More specifically, the lane line recognizer 30 applies pattern matching based on patterns of the lane partition line 12 specific to the start point 20 and the end point 22 of each entrance and exit 16, thereby recognizing the start point 20 and the end point 22 of the entrance and exit 16. Templates as shown on FIGS. 6, 7 are pre-stored in the lane line recognizer 30. FIG. 6 shows a template used to search for the start point 20 of the entrance and exit 16 (hereinafter referred to as a start point template 40). FIG. 7 shows a template used to search for the end point 22 of the entrance and exit 16 (hereinafter referred to as an end point template 42).

At the start point 20 of the entrance and exit 16, as shown in FIG. 2, the first sub-line 12*a* and the fourth sub-line 12*d* approach each other to connect with each other in the forward traveling direction of the vehicle A. After the first sub-line 12*a* and the fourth sub-line 12*d* are connected, unit lines 18*a* of the broken lane line 18 will appear in the forward traveling direction of the vehicle A. That is, at the start point 20 of the entrance and exit 16, a portion of the lane partition line 12 formed such that two lane lines approach each other to connect with each other in the forward traveling direction of the vehicle A and a rectangular portion of the lane partition line 12 are aligned with each other in the forward traveling direction of the vehicle A.

Thus, the start point template 40, as shown in FIG. 6, has a schematic pattern of the lane partition line 12 specific to the start point 20 of the entrance and exit 16. That is, the start point template 40 is employed such that a portion 41 of the lane partition line 12 formed such that two lines approach each other to connect with each other in the upward direction of the FIG. 6 and a rectangular portion (rectangle) 44 of the lane partition line 12 are aligned with each other in the upward direction of the FIG. 6.

At the end point 22 of the entrance and exit 16, as shown in FIG. 2, following the unit lines 18a of the broken lane line 18, the first sub-line 12a and the fourth sub-line 12d spread apart from each other in the forward traveling direction of the vehicle A. That is, at the end point 22 of the entrance and exit 16, a rectangular portion of the lane partition line 12 and a portion of the lane partition line 12 formed such that two lane lines spread apart from each other in the forward traveling direction of the vehicle A are aligned with each other in the forward traveling direction of the vehicle A.

Thus, the end point template 42, as shown in FIG. 7, has a schematic pattern of the lane partition line 12 specific to the end point 22 of the entrance and exit 16. That is, the end point template 42 is employed such that a rectangular portion (rectangle) 46 of the lane partition line 12 and a portion 48 of the lane partition line 12 formed such that two lines spread apart from each other in the upward direction of the FIG. 7 are aligned with each other in the upward direction of the FIG. 7.

The lane line recognizer 30 applies a well-known matching technique to the road surface image captured by the camera 28 using the start point template 40 and the end point template 42, thereby searching for the start point 20 and the end point 22 of each entrance and exit 16. When the lane line recognizer 30 recognizes portions of the road surface image matching the start point template 40 and the end point template 42, the determiner 32 determines the start point 20 and the end point 22 of the entrance and exit 16.

Except for the method of the lane line recognizer 30 recognizing the start point 20 and the end point 22 of the entrance and exit 16, the operations of the road surface information acquisition apparatus 24 of the present modification are similar to those of the road surface information acquisition apparatus 24 of the above embodiment. The flowchart of the control flow of the present modification is also similar to that of the above embodiment described with reference to FIGS. 4 and 5. Therefore, the operations of the road surface information acquisition apparatus 24 of the present modification are omitted.

The road surface information acquisition apparatus 24 of the present modification can provide the following additional advantages to the advantages (1)-(4) of the above embodiment.

(7) When the lane line recognizer 30 recognizes the marking pattern specific to the start point 20 of the entrance and exit 16 via the pattern matching, the determiner 32 determines the start point 20 of the entrance and exit 16. That is, the determiner 32 determines the start point 20 of the entrance and exit 16 based on the marking pattern specific to the start point 20 of the entrance and exit 16, which allows the start point 20 of the entrance and exit 16 to be recognized properly.

(8) When the lane line recognizer 30 recognizes the marking pattern specific to the end point 22 of the entrance and exit 16 via the pattern matching, the determiner 32 determines the end point 22 of the entrance and exit 16. That is, the determiner 32 determines the end point 22 of the entrance and exit 16 based on the marking pattern specific to the end point 22 of the entrance and exit 16, which allows the end point 22 of the entrance and exit 16 to be recognized properly.

The road surface information acquisition apparatuses in accordance with the above embodiment and its modifications may be modified as follows.

In the above embodiment, the lane line recognizer is configured to detect edge points in the road surface image, thereby recognizing each lane line. Alternatively, templates for various lane line (i.e., the side line, the lane partition line and the like) may be stored in the lane line recognizer. The lane line recognizer may be configured to recognize the lane lines via pattern matching using the templates.

In the embodiment and its modifications, the camera configured to acquire color images is used as the image acquirer. The image acquirer does not necessarily have to acquire road images as color images. Alternatively, a camera configured to acquire road images as monochrome images may be used such that it can acquire types and positions of lane lines defining the carpool lane.

In the embodiment and its modifications, the assistance apparatus is configured to conduct the lane keeping control using the lane width of the carpool lane acquired by the road surface information acquisition apparatus. However, the lane width acquired by the road surface information acquisition apparatus may be used for purposes other than the lane keeping control. For example, the target travel line may be set based on the lane width of the carpool lane acquired by the road surface information acquisition apparatus. The assistance apparatus may be configured to emit a warning to the driver if the vehicle significantly deviates from the target travel line.

CROSS-REFERENCE TO RELATED APPLICATION

This application claims priority under the Paris Convention on Japanese Patent Application No. 2013-136250 (filed Jun. 28, 2013), the content of which is incorporated by reference herein.

REFERENCE SIGNS LIST

10 . . . Ordinary lane
12 . . . Lane partition line
16 . . . Entrance and Exit
18 . . . Broken lane line
20 . . . Start point
22 . . . End point
24 . . . Road surface information acquisition apparatus
28 . . . Camera
30 . . . Lane line recognizer
32 . . . Determiner
34 . . . Lane-width calculator
36 . . . Lane-width corrector
A . . . Vehicle
CL . . . Carpool lane

The invention claimed is:
1. A road surface information acquisition apparatus for a carpool lane that is provided with entrances and exits at given spacing intervals, a lane width of each of entrance-and-exit lane sections of the carpool lane being set greater than a lane width of each of lane sections of the carpool lane other than the entrance-and-exit lane sections, the apparatus comprising:

an image acquirer configured to capture an image of a road surface of the carpool lane in a forward traveling direction of a vehicle to acquire a road surface image;

a lane line recognizer configured to, based on the road surface image acquired by the image acquirer, recognize lane lines marked on the road surface of the carpool lane;

a determiner configured to determine a start point of the entrance and exit of the carpool lane based on a broken line as part of a lane partition line between the carpool lane and an ordinary lane, the lane partition line being recognized by the lane line recognizer;

a lane-width calculator configured to, based on the lane lines recognized by the lane line recognizer, calculate a lane width of the carpool lane; and a corrector configured to, upon the determiner determining the start point of the entrance and exit of the carpool lane, correct the lane width calculated by the lane-width calculator.

2. The apparatus of claim 1, wherein the corrector is configured to, when the determiner determines the start point of the entrance and exit, cancel the lane width calculated by the lane-width calculator, and determine, as a current lane width of the carpool lane, the lane width calculated by the lane-width calculator before the determiner determines the start point of the entrance and exit.

3. The apparatus of claim 2, wherein the determiner is configured to, while the lane line recognizer recognizes the broken line as the lane partition line, determine that the vehicle is passing the entrance and exit, and the corrector is configured to, while the determiner determines that the vehicle is passing the entrance and exit, cancel the lane width calculated by the lane-width calculator, and maintain, as the current lane width of the carpool lane, the lane width calculated by the lane-width calculator before the determiner determines the start point of the entrance and exit.

4. The apparatus of claim 1, wherein the determiner is configured to determine the start point of the entrance and exit of the carpool lane upon change of the lane partition line recognized by the lane line recognizer from a solid line to the broken line.

5. The apparatus of claim 1, wherein the determiner is configured to, when the lane line recognizer recognizes that a portion of the lane partition line shaped such that that two lane lines approach each other to connect with each other in the forward traveling direction of the vehicle and a rectangular portion of the lane partition line are aligned in this order in the forward traveling direction of the vehicle, determine the start point of the entrance and exit of the carpool lane.

6. The apparatus of claim 1, wherein the determiner is configured to, based on the broken line as the lane partition line recognized by the lane line recognizer, determine an end point of the entrance and exit of the carpool lane, and the corrector is configured to, when the determiner determines the end point of the entrance and exit, determine the lane width calculated by the lane-width calculator as a current lane width of the carpool lane.

7. The apparatus of claim 6, wherein the determiner determines the end point of the entrance and exit of the carpool lane upon change of the lane partition line recognized by the lane line recognizer from the broken line to a solid line.

8. The apparatus of claim 6, wherein the determiner is configured to, when the lane line recognizer recognizes that a rectangular portion of the lane partition line and a portion of the lane partition line shaped such that two lane lines spread apart from each other in the forward traveling direction of the vehicle are aligned in this order in the forward traveling direction of the vehicle, determine the end point of the entrance and exit of the carpool lane.

9. A road surface information acquisition apparatus for a carpool lane that is provided with entrances and exits at given spacing intervals, a lane width of each of entrance-and-exit lane sections of the carpool lane being set greater than a lane width of each of lane sections of the carpool lane other than the entrance-and-exit lane sections, the apparatus comprising:

an image acquirer configured to capture an image of a road surface of the carpool lane in a forward traveling direction of a vehicle to acquire a road surface image;

a lane line recognizer configured to, based on the road surface image acquired by the image acquirer, recognize lane lines marked on the road surface of the carpool lane;

a determiner configured to determine a start point of the entrance and exit of the carpool lane based on a broken line as part of a lane partition line between the carpool lane and an ordinary lane, the lane partition line being recognized by the lane line recognizer;

a target travel line setter configured to, based on the lane lines recognized by the lane line recognizer, set a target travel line;

a lane-width calculator configured to, based on the lane lines recognized by the lane line recognizer, calculate a lane width of the carpool lane; and a corrector configured to, upon the determiner determining the start point of the entrance and exit of the carpool lane, correct the lane width calculated by the lane-width calculator, wherein the target travel line setter is configured to, based on determinations made by the determiner, maintain the lane width of each of the lane sections of the carpool lane other than the entrance-and-exit lane sections while the vehicle is traveling in the entrance-and-exit lane section of the carpool lane.

* * * * *